(12) United States Patent
Scott et al.

(10) Patent No.: US 10,826,563 B2
(45) Date of Patent: Nov. 3, 2020

(54) POWER LINE COMMUNICATION SYSTEM AND METHOD OF AUTO-COMMISSIONING SYSTEM NODES

(71) Applicant: ABL IP Holding, LLC, Conyers, GA (US)

(72) Inventors: Jeffrey Michael Scott, San Pablo, CA (US); Michael Miu, Castro Valley, CA (US)

(73) Assignee: ABL IP Holding, LLC, Conyers, GA (US)

( * ) Notice: Subject to any disclaimer, the term of this patent is extended or adjusted under 35 U.S.C. 154(b) by 0 days.

(21) Appl. No.: 16/181,165

(22) Filed: Nov. 5, 2018

(65) Prior Publication Data

US 2019/0103894 A1    Apr. 4, 2019

Related U.S. Application Data

(63) Continuation of application No. 15/883,678, filed on Jan. 30, 2018, now Pat. No. 10,122,412.

(60) Provisional application No. 62/452,312, filed on Jan. 30, 2017.

(51) Int. Cl.
| | |
|---|---|
| *H04B 3/54* | (2006.01) |
| *H05B 45/00* | (2020.01) |
| *H05B 47/185* | (2020.01) |
| *H04B 3/58* | (2006.01) |

(52) U.S. Cl.
CPC .............. *H04B 3/542* (2013.01); *H04B 3/546* (2013.01); *H04B 3/548* (2013.01); *H05B 45/00* (2020.01); *H05B 47/185* (2020.01); *H04B 3/58* (2013.01)

(58) Field of Classification Search
None
See application file for complete search history.

(56) References Cited

U.S. PATENT DOCUMENTS

| | | | |
|---|---|---|---|
| 5,986,539 A | 11/1999 | Johansson et al. | |
| 6,995,658 B2 | 2/2006 | Tustison et al. | |
| 7,230,522 B2 | 6/2007 | Stevens | |
| 8,296,488 B2 | 10/2012 | Westrick, Jr. et al. | |
| 8,674,539 B1 | 3/2014 | Magin et al. | |
| 9,391,452 B1 | 7/2016 | Cousinard et al. | |
| 9,396,868 B2 | 7/2016 | Yu | |
| 9,408,258 B2 | 8/2016 | Siessegger | |
| 9,420,670 B1 | 8/2016 | Xiong et al. | |
| 9,622,329 B2 | 4/2017 | Campbell | |
| 10,122,412 B2 | 1/2018 | Scott | |
| 2011/0134976 A1 | 6/2011 | Fossion et al. | |
| 2013/0300208 A1 | 11/2013 | Yu et al. | |
| 2014/0103706 A1 | 4/2014 | Agusti Costa et al. | |
| 2017/0093230 A1 | 3/2017 | Yundt et al. | |

FOREIGN PATENT DOCUMENTS

| | | |
|---|---|---|
| EP | 0470185 | 11/1995 |
| EP | 1536572 | 6/2005 |

OTHER PUBLICATIONS

Singh, Ajinder and Hermann, Dave, "TI Designs: DC Power-Line Communication Reference Design," TIDU160, Oct. 2013.

*Primary Examiner* — Carlos Garcia
(74) *Attorney, Agent, or Firm* — Beeson Skinner Beverly, LLP

(57) ABSTRACT

A method for auto-commissioning of multiple device control modules on a power line during the power up of the system. Device control modules associated with the peripheral devices are powered up sequentially and a unique address is assigned to each device controller when it is powered up.

28 Claims, 17 Drawing Sheets

POWER LINE COMMUNICATION SYSTEM AND METHOD OF AUTO-COMMISSIONING SYSTEM NODES

CROSS-REFERENCE TO RELATED APPLICATIONS

This application is a continuation of U.S. patent application Ser. No. 15/883,678 filed Jan. 30, 2018, now U.S. Pat. No. 10,122,412, which claims the benefit of U.S. Provisional Patent Application No. 62/452,312 filed Jan. 30, 2017.

GOVERNMENT RIGHTS

This invention was made with Government support under U.S. Department of Energy Award No. DE-EE0007073. The Government has certain rights in the invention.

BACKGROUND

The present invention generally relates to methods for monitoring and controlling multiple devices connected to a common power line, and more particularly to a DC power line communication system. The invention has particular application to monitoring and controlling lighting elements or fixtures of a lighting system over a DC power bus to which the lighting elements or fixtures are connected. However, it will be appreciated that the invention will have other applications wherein it is desired to monitor and/or control multiple devices powered from a common low voltage DC power line.

Power line communication (PLC) systems used for controlling multiple components of a closed system, such as the lighting elements of a lighting system or fixture, are well known. Such systems allow inter-component communications to be achieved without bulky wiring and complicated configurations. However, such systems generally are not easily serviced when addressable components of the system need to be replaced or exchanged. They also have another disadvantage, in that communication nodes used with the lighting elements typically involve relatively costly parts that, when multiplied over many addressable components, can add tremendous cost to the system. The present invention allows for the implementation of a DC power line communication system with relatively inexpensive components and one that provides for an auto-commissioning capability during the power up which eliminates operational drawbacks of conventional PLC systems. The PLC system in accordance with the invention can be implemented in conventional DC two-wire wiring configurations without the need to add extra communication lines, and it allows the system-connected devices to be easily serviced or replaced.

SUMMARY OF THE INVENTION

The present invention provides for a PLC system and method that permit serial communications with and between multiple peripheral devices connected to and powered from a common DC power line. The devices could be lighting elements of a light fixture or system, or other devices capable of being sensed or controlled, for example, proximity sensors, smoke detectors, messaging devices and/or alarms.

The method of the invention provides for auto-commissioning multiple device control modules (sometimes referred to as "nodes," "device controllers," "panel controllers," or simply "controllers") for multiple devices, wherein device control modules associated with the peripheral devices are powered up sequentially and wherein a unique address is assigned to each device controller when it is powered up. If a device and associated controller are added, replaced, or removed, the system set-up will remain unaffected, as the added, replaced, or removed device will be assigned a unique address every time the system is repowered up.

DETAILED DESCRIPTION OF THE ILLUSTRATED EMBODIMENTS

Figure 1:
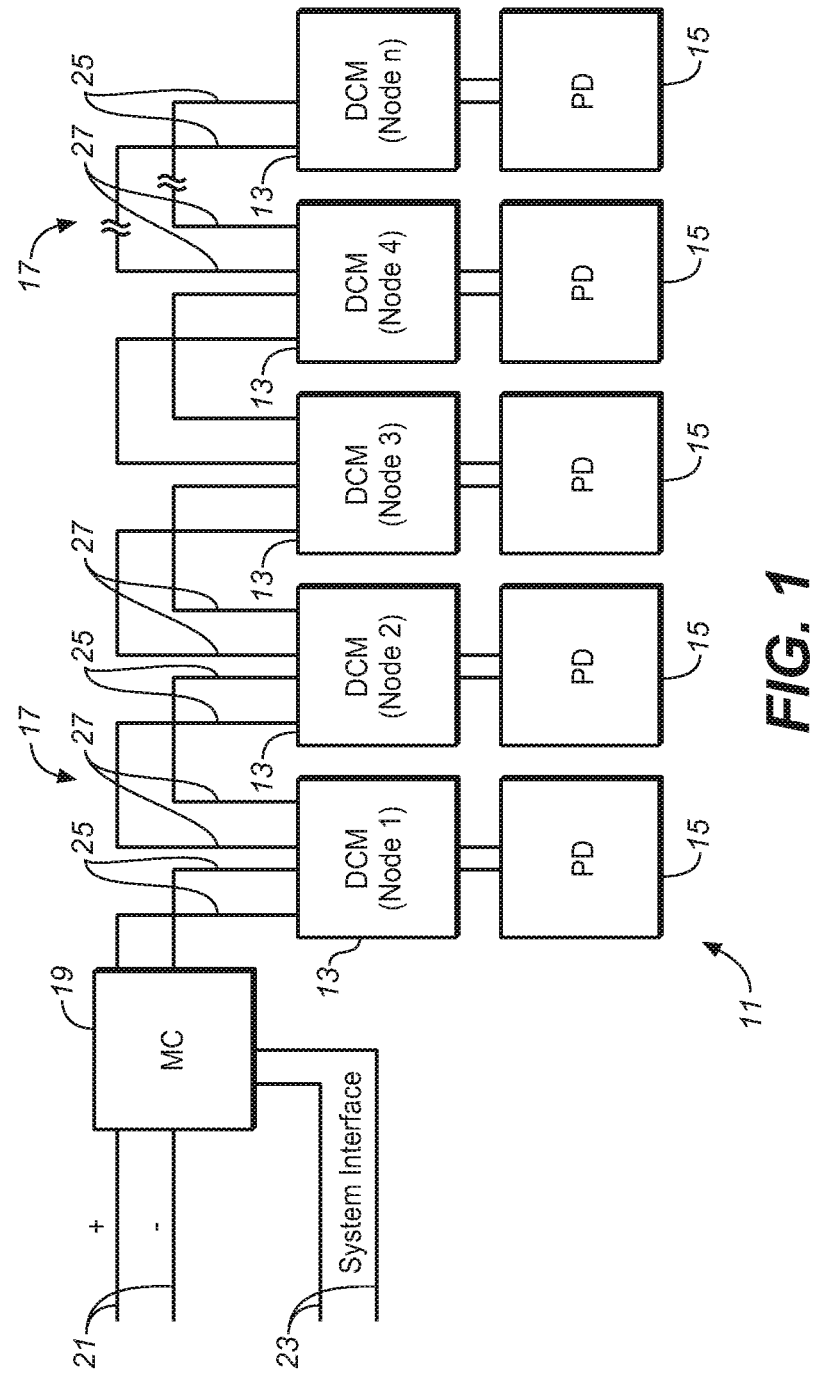
FIG. 1 is a schematic drawing of an exemplary topology for a power line communication system in accordance with the invention, showing multiple device control modules daisy-chained together.

FIG. 1 illustrates the general configuration of a PLC system 11 in accordance with the invention wherein multiple device control modules or "nodes" 13 associated with multiple peripheral devices 15 are connected to a common DC power line or bus 17. As hereinafter described, communication over the DC power line occurs by means of sequences of voltage pulses transmitted on the DC power line, wherein the voltage pulses represent serial digital data or control signals capable of being processed locally at any system node. A master controller 19 is suitably provided at the front end of the PLC system for use in powering-up of the system. The shown positive and negative wire inputs 21 to the master controller are from a source of DC power, most suitably at 12 volts DC; however, the master controller could alternatively include an AC-DC converter to accommodate an AC power feed. System control interfaces, for example dimmer switches of a lighting system, can also be connected to the master controller as illustrated by wire connections 23.

As hereinafter described, each of the device control modules is addressable, and as hereinafter described, the primary role of the master controller is to assign addresses to the device control modules connected to the common DC power bus during power-up. When the system is switched on, the master controller 19 sequentially communicates with each of the device control modules to sequentially assign unique addresses to each device control module. Once unique addresses are assigned, the master controller will be able to communicate with the device control modules over the DC power bus.

Figure 2:
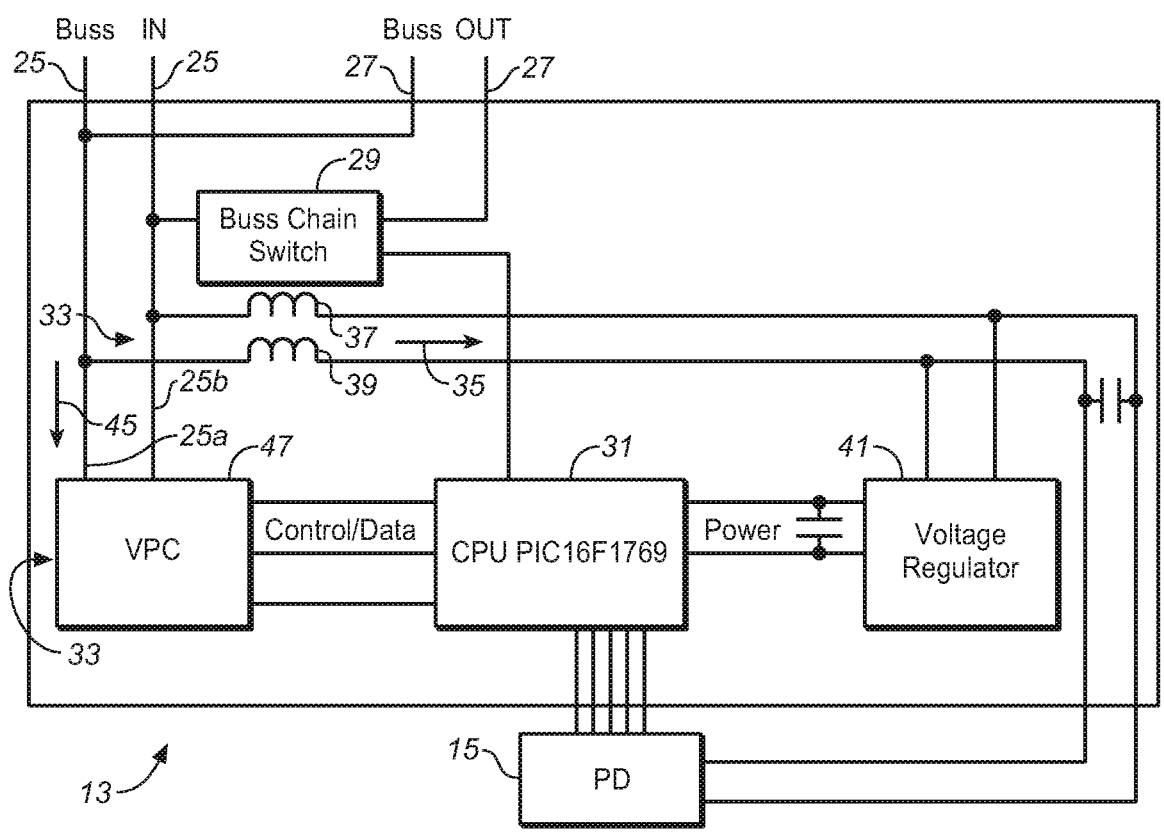
FIG. 2 is a circuit diagram of a device control module making up each of the nodes of the PLC system, showing a module with an analog input circuit having a DC power path and a digital signal communication path, and additionally with a sequencing switch used for sequentially powering up each device control module on the PLC system one module at a time.

FIG. 2 is a functional block diagram of an individual device control module shown in FIG. 1. Each control module 13 has an input comprised of input wire pairs 25 and an output comprised of output wire pairs 27. From FIG. 1, it is seen that the control modules are daisy chained together such that any one of the control modules after the first module is connected to the power bus through its upstream control module or modules. This connection is controlled through the power line switch 29 (referred to herein as a "bus chain switch") in each of the control modules; activation of this switch connects the device control module to the power bus 17 for allowing communication with the next control module in the chain. This serial activation of the chain bus switches of the daisy-chained control modules uniquely allows for the auto-commissioning procedure described herein. Until the bus chain switch of a control module in the chain is switched on, downstream control modules are off the power bus and cannot receive communications from or respond to the master controller.

With further reference to FIG. 2, the device control module 13 is seen to include a central computer processing unit (CPU) 31, which can be a suitable UART enabled computer chip, and an analog input circuit 33. The analog input circuit has two basic functions: it provides a path for serial digital communications with the CPU and a separate DC power path. The separate DC power path is denoted by the arrow 35 and is configured to allow DC power to pass through this circuit path while blocking voltage pulses superimposed on the DC power line wires, referred to herein as "AC blocking." AC blocking is achieved by in-line inductors 37, 39 placed in this path. (Later described is a technique for minimizing the size of the inductors needed to reject the incoming voltage pulses on the DC power line.) The inductors act to isolate the DC power supply from the communications signals.

It is seen that the DC power passing through the DC power path powers the CPU 31 through voltage regulator 41; it also powers the peripheral device 15 associated with the device control module. The digital signal communication path, denoted by the arrow 45, is on the other hand configured to block DC power while passing through the voltage pulses superimposed on the DC power line. This path provides a transmission path through which the CPU, and particularly the UART embedded in the CPU, can receive properly conditioned serial digital data and control signals from the master control unit. The configuration that achieves this is a simple, low cost voltage pulse conditioning (VPC) circuit 47 shown in front of the CPU 31. This simple circuit, which is described in greater detail below and which is comprised mostly of passive components, will allow for high baud rates of 500 Kbaud+, making it ideal for applications like multi-panel OLED lighting fixtures where serviceability and cost are an issue due to high node counts.

Figure 3:
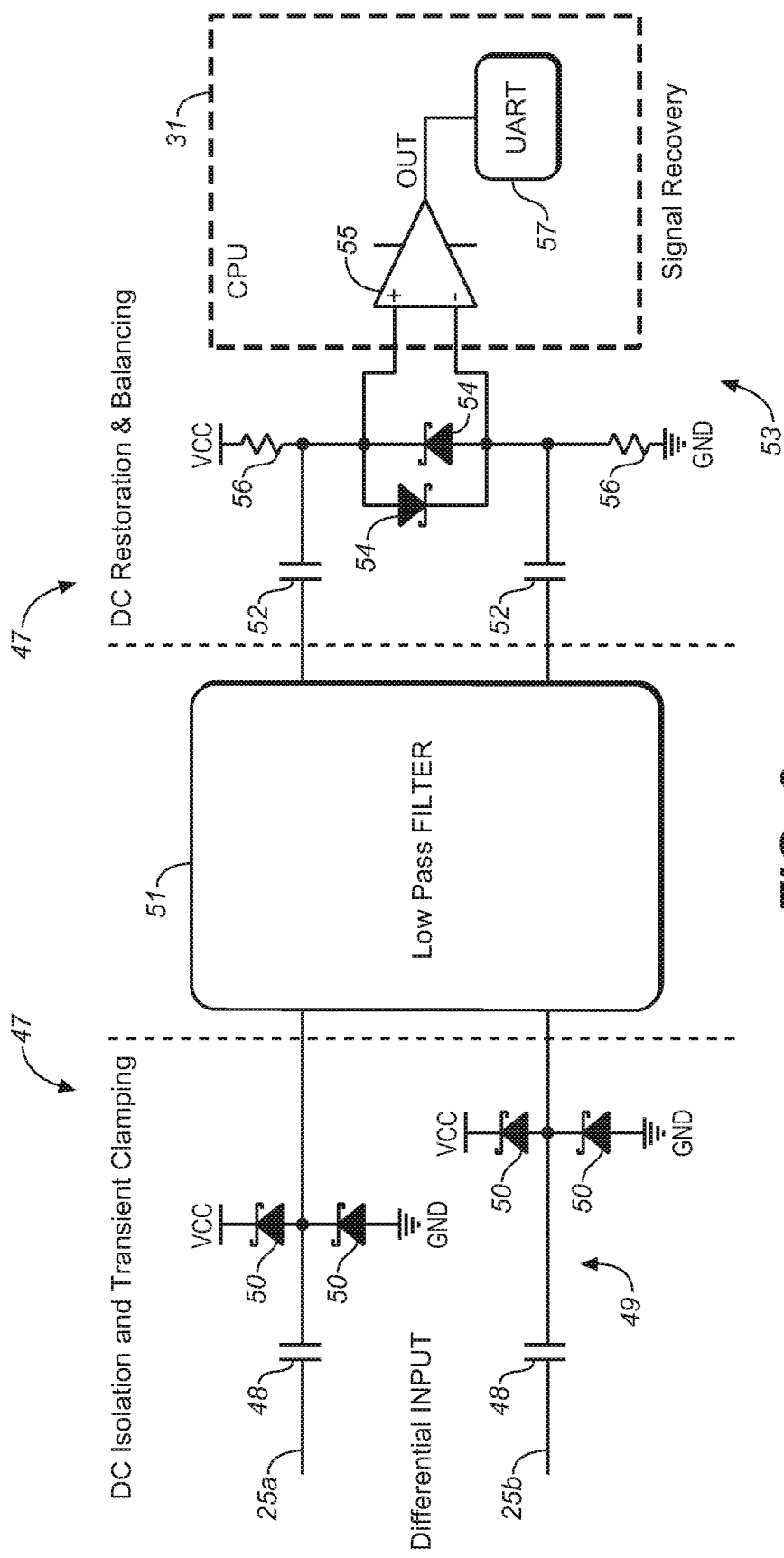
FIG. 3 is a circuit diagram illustrating a configuration for the digital signal communication path of the analog input circuit of the device control module.

FIG. 3 shows in greater detail the VPC circuit 47 of the device control module. This circuit is seen to have an input section 49 for receiving a differential input (differential voltage pulses on two wires 25a, 25b of the DC power lines), followed by a low pass filter section 51, and a backend section 53. The input section 49 of the VPC circuit provides DC isolation on the wires 25a, 25b, such that what remains on each wire are voltage pulses of opposite polarity. The DC isolation is provided by coupling capacitors 48, while a set of clamping diodes 50, suitably Schottky diodes, on each wire prevents large voltage excursions. The low pass filter section 51 removes AC modulation from AC modulated differential voltage pulses on wires 25a, 25b. The backend section 53, which includes DC blocking capacitors 52, back-to-back diodes 54 (again suitably Schottky diodes), and resistors 56 for common mode voltage control, then provides DC restoration and balancing of the voltage pulses. This backend section compensates for small DC variances induced in the system and clips the signal to a constant value (e.g. a few hundred millivolts) to provide a more predictable and consistent signal for tripping the comparator 55. Comparator 55 is provided at the backend for recovery of the pulse shapes prior to receipt by the UART 57. (The comparator 55 can be part of the CPU as shown in the drawings or external to the CPU.) The above described voltage pulse conditioning would normally be done with a complex AGC system consisting of a lot of active circuitry. The much simpler system illustrated in FIG. 3 does not require active feedback and is self-clamping.

Figure 4A:
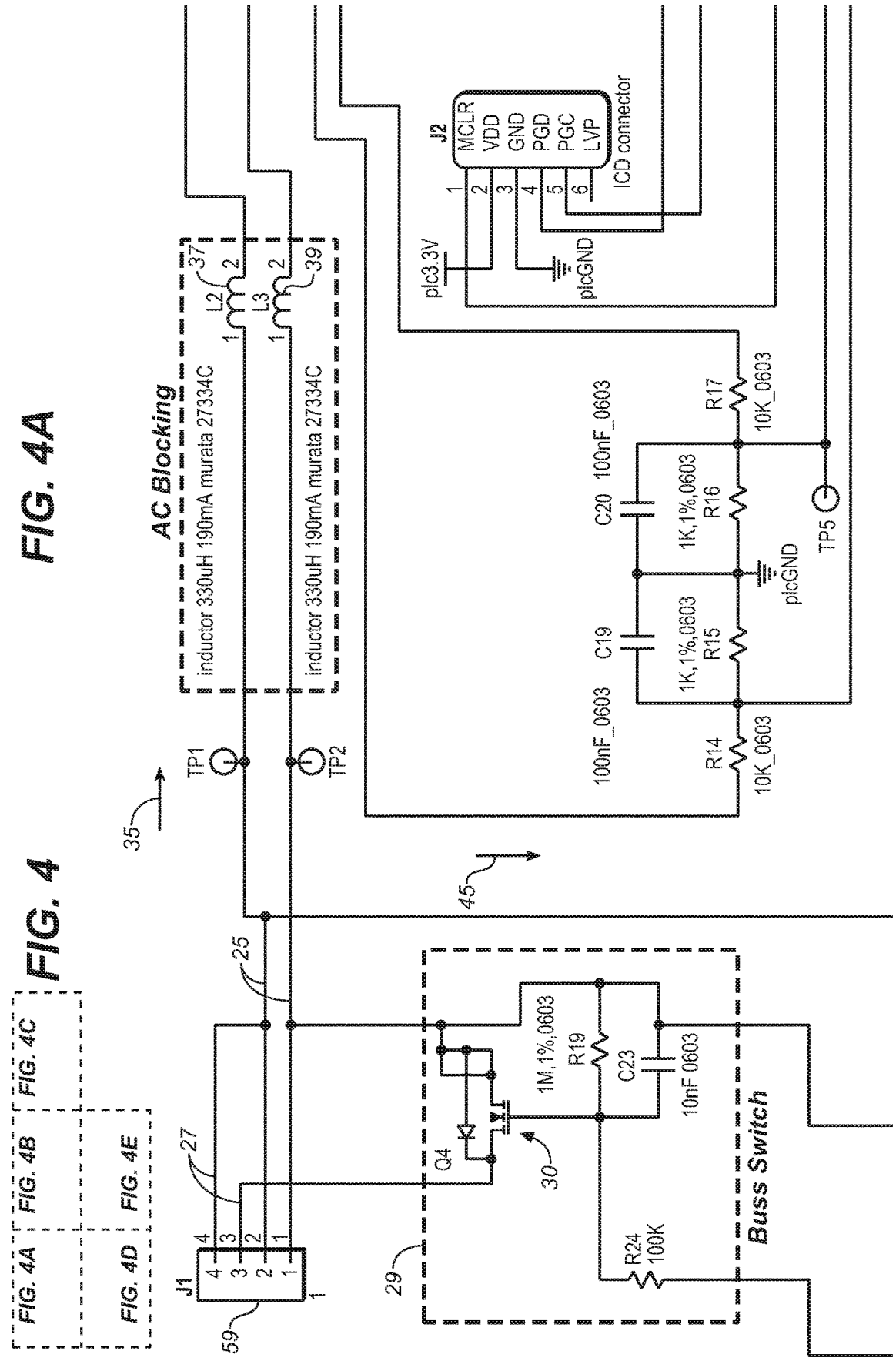
FIGS. 4A-4E show a circuit diagram showing a detailed circuit implementation of the device control modules shown in FIGS. 1-3.

FIGS. 4A-4E represent a circuit diagram showing an implementation of the device control module, including the above-described analog input circuit, in greater detail. This exemplary circuit is adapted for a device control module for a lighting system having multiple lighting elements, such as OLED panels, as the peripheral devices. The circuit segment in FIG. 4A shows a 4-wire connector 59, with inputs "1" and "2" for input wires 25 connecting the device control module or "panel controller" to the DC power bus on the upstream module side, and outputs "3" and "4" for output wires 27 connecting the device control module to the power bus on the side of the downstream modules. (Referring to FIG. 1, it is seen that the output wires 27 of one module become the input wires of the next downstream module.) The DC power path 35 and digital signal communication path 45 are connected to the input side of the wire connector, while the bus chain switch 29, which includes a FET switch 30, is connected on the output side of the connector. The inductors 37, 39 in DC power path 35 provide AC blocking to isolate the communication signals (serial voltage pulses) from the DC power.

Figure 4B:
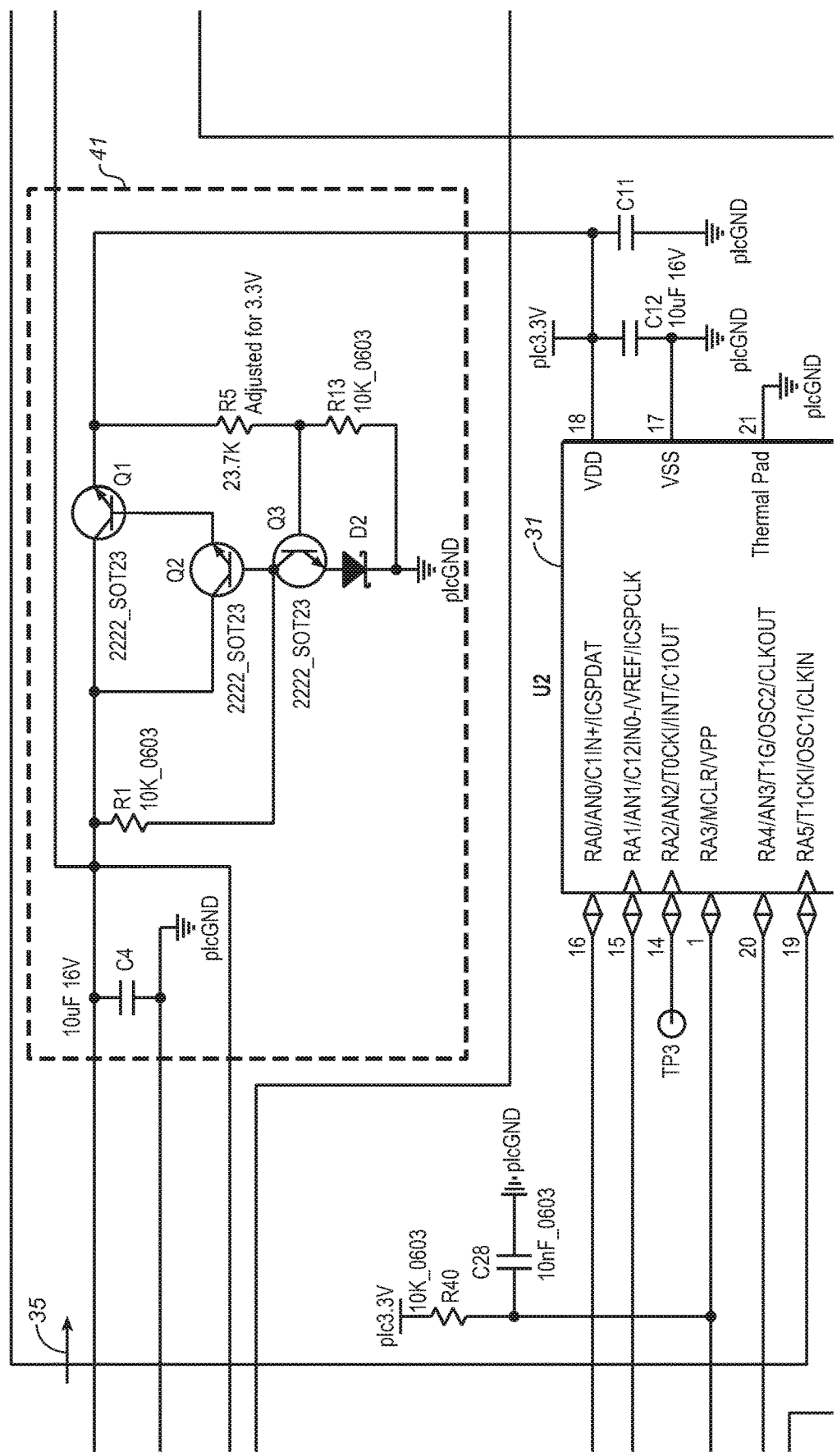
Figure 4C:
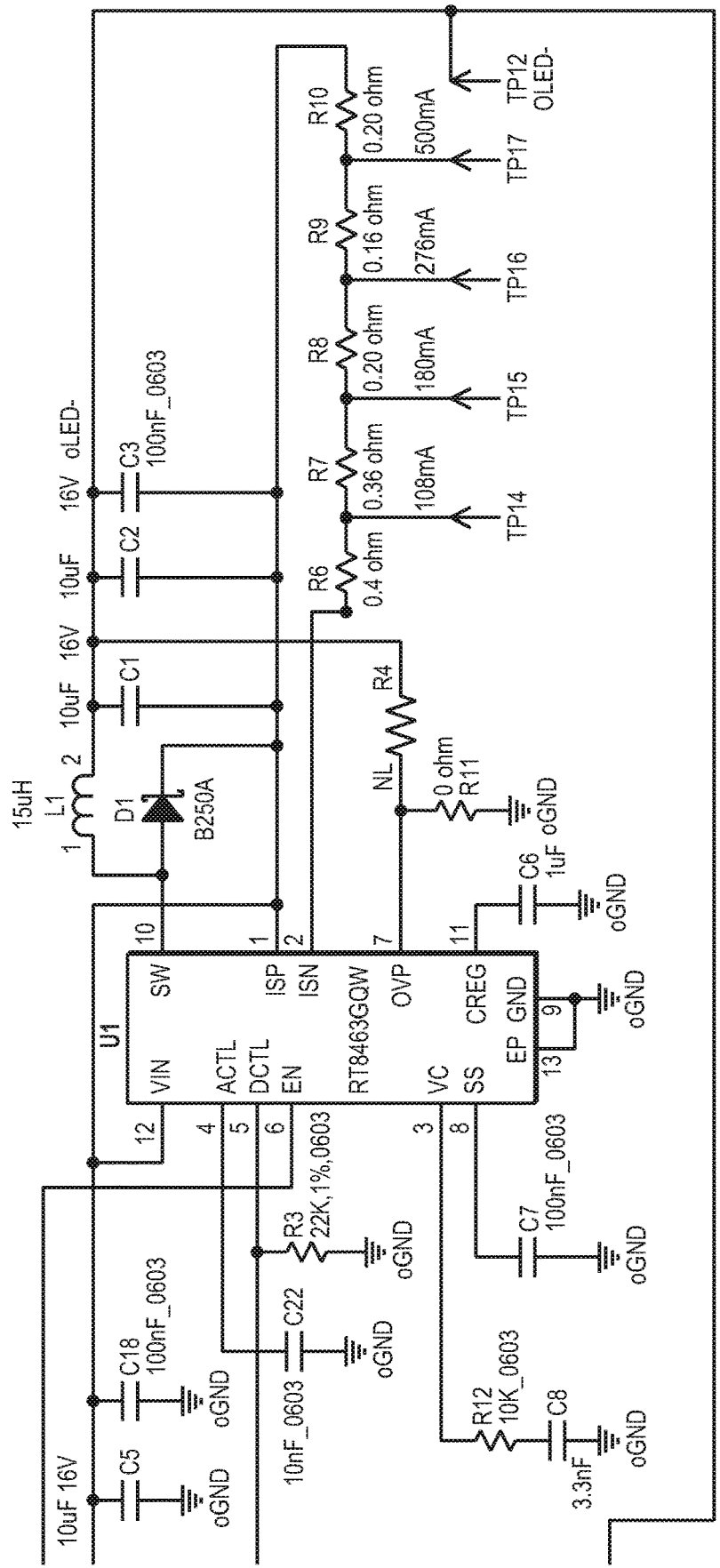

A more detailed schematic of the voltage regulator 41, which regulates the voltage supplied to the CPU, is shown in FIG. 4B. The voltage regulator can, for example, step the voltage down from the 12-volt DC line voltage to 3.3 volts DC. The circuit segment shown in FIG. 4C is an integrated driver circuit for the OLED panel connected to the device control module. This circuit regulates the current supplied to the OLED panels.

Figure 4D:
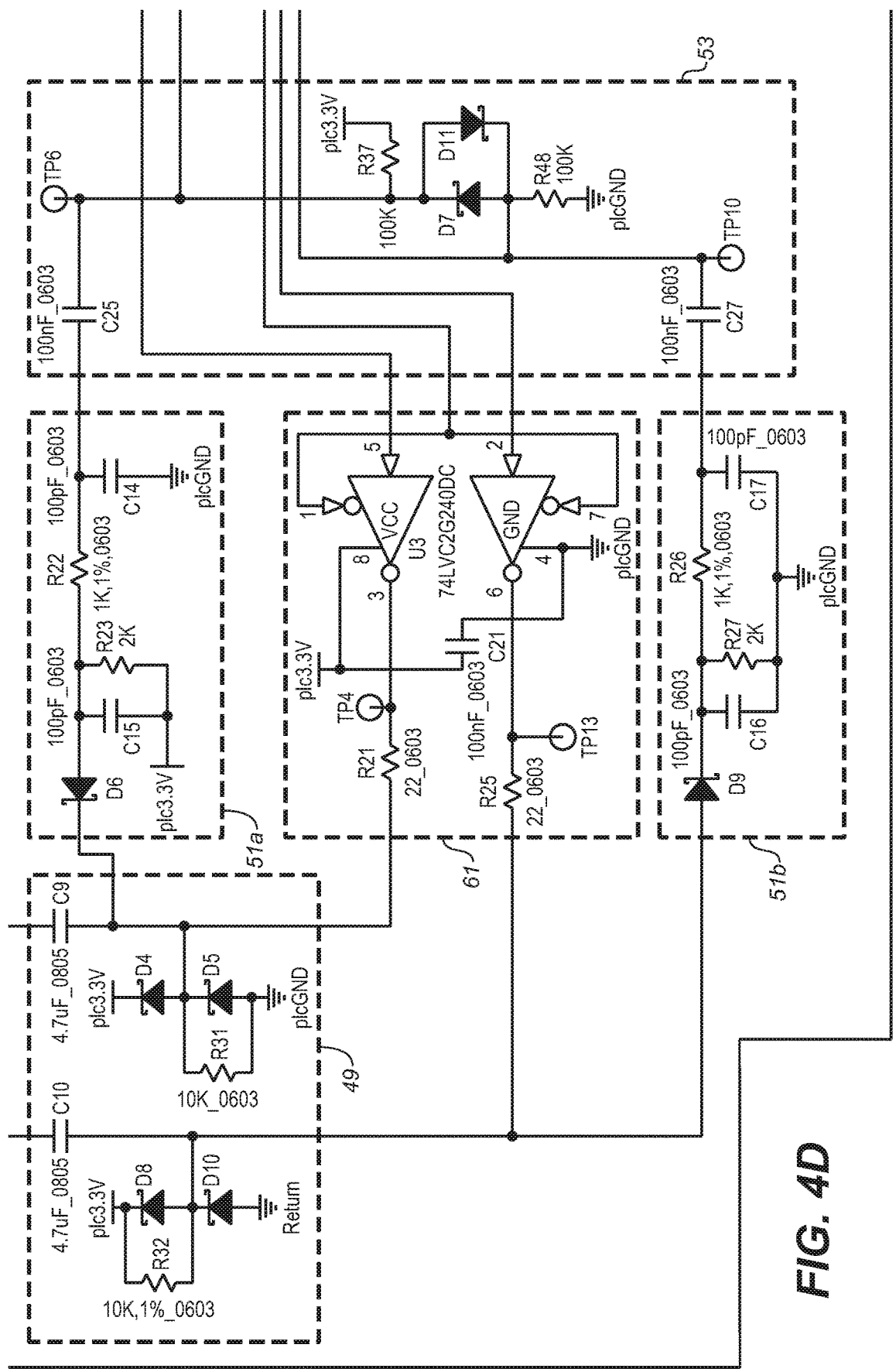

The circuit segment illustrated in FIG. 4D shows the VPC circuit, which is made up of the DC blocking input section 49, the low pass filter section implemented by the two RC circuit blocks 51a, 51b, and the backend section 53. In addition, FIG. 4D shows a transmitter 61, which allows the device control module to communicate with other controllers (nodes) on the PLC system.

Figure 4E:
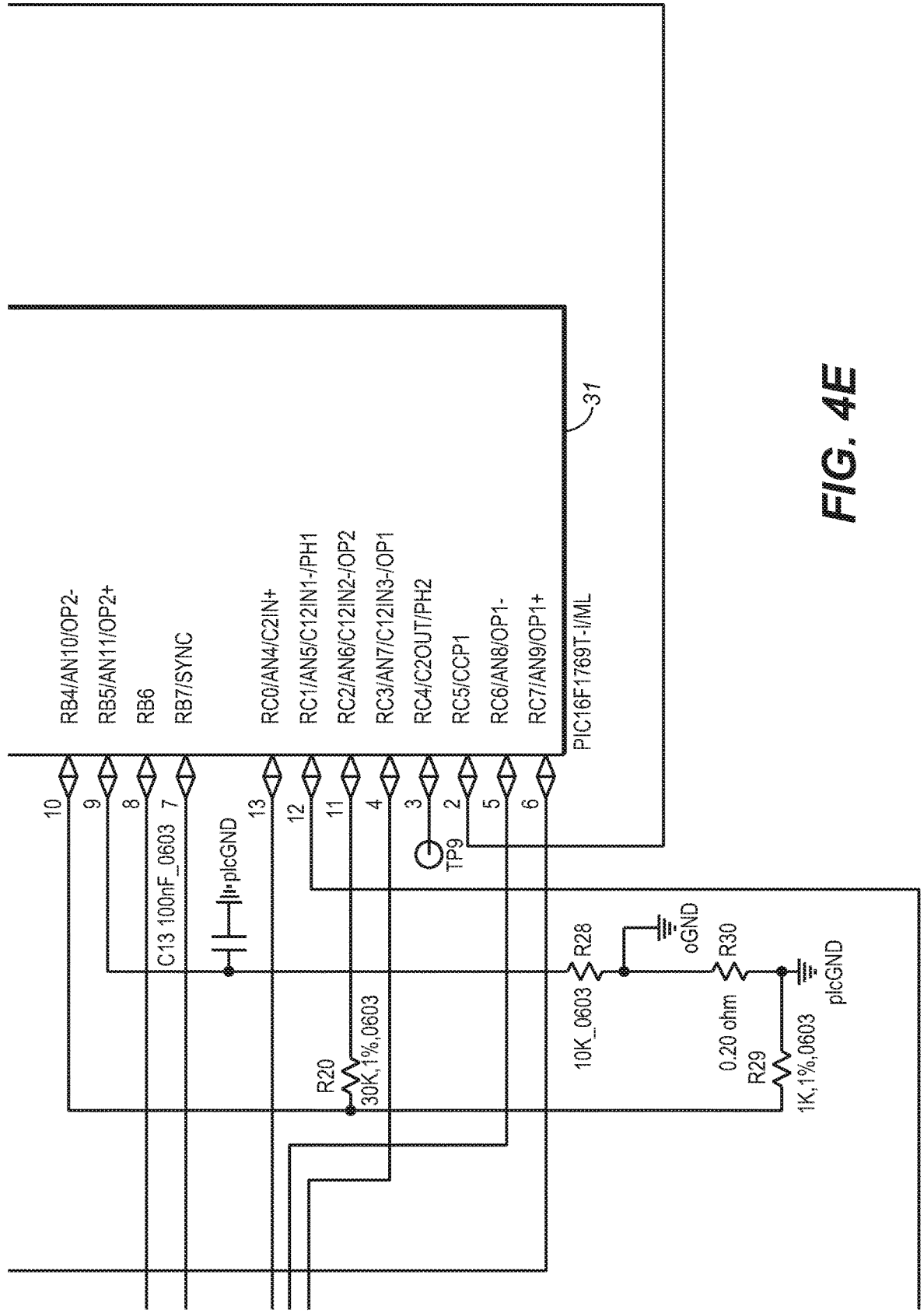

FIG. 4E simply shows the remaining connections to the CPU not shown in the other figures. The CPU can be a simple and inexpensive microprocessor as it only needs to control the one peripheral device and not keep track of the whole system.

Figure 5:
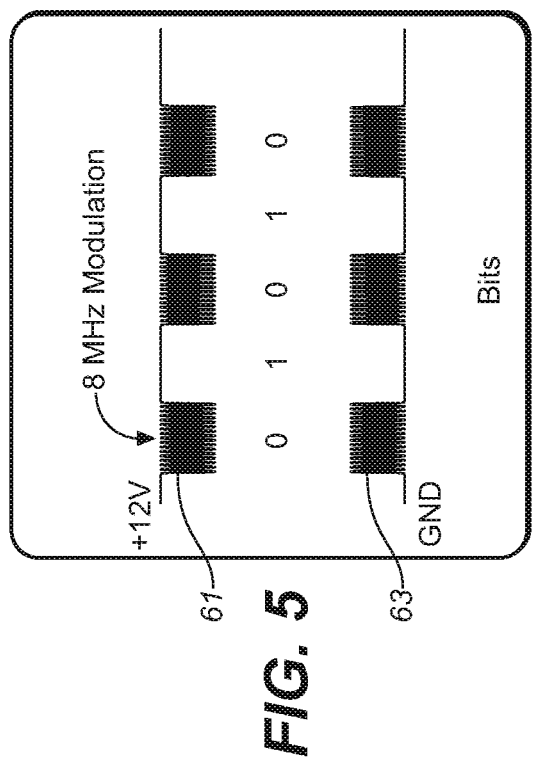
FIG. 5 is a graphical illustration of an AC modulated serial bit stream that is transmitted over the power line of the PLC system for communicating with the device control modules connected to the power line.
Figure 6:
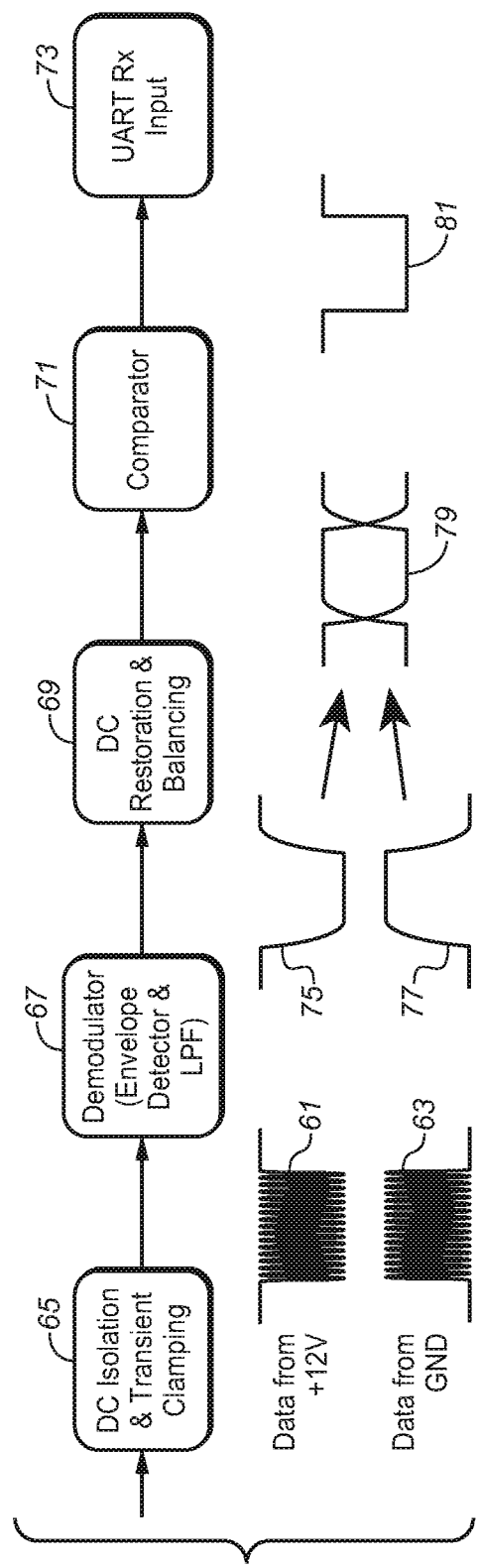
FIG. 6 is a block diagram graphically illustrating the functions of the digital signal communication path of the analog input circuit of the device control module, wherein sequences of voltage pulses representing serial digital data and control signals transmitted on the DC power line are removed and restored for inputting to a UART device.

FIGS. 5 and 6 illustrate the voltage pulse conditioning scheme described above wherein the serial data and control signals can be communicated over the PLC system with low cost circuit implementations described above. FIG. 5 shows a serial bit stream comprised of five bits of data representing 1s and 0s. The 0 bits are provided as differential voltage pulses 61, 63 on the two wires of the DC power line 17. The two wires are denoted as +12 v and "GND" for ground. While "GND" for ground is indicated, it will be understood that this does not represent physical ground but rather a return or neutral line. The indicated positive voltage (+12 v) is the voltage relative to the return line. In FIG. 3, the positive wire is denoted 25a and the return or "ground" wire as 25b. In FIGS. 5 and 6, it is seen that the voltage pulses impressed on wires 25a and 25b shown in FIG. 3 are differential, that is of equal and opposite polarity, with the pulses 61 on the positive DC voltage wire being negative and the pulses 63 on the return wire being positive. As illustrated in FIGS. 5 and 6, the voltage pulses on both wires are preferably modulated with a high frequency signal, suitably in the range of 8 Mhz. As indicated above, this AC modulation allows for the use of much smaller inductors in the DC signal path 35.

FIG. 6 illustrates the signal processing that occurs within the voltage conditioning circuit. It is seen here that the AC modulated differential voltage pulses are taken off the DC power line, demodulated and conditioned for the CPU's UART input. As a first step, the voltage pulses undergo DC isolation and transient clamping (block 65), leaving differential AC modulated voltage pulses 61, 63 on the positive and return wires 25a, 25b shown in FIG. 3. Next, a low pass filter removes the AC modulation from the differential voltage pulses leaving differential pulse envelopes 75, 77 (block 67). Then there is a DC restoration of the pulses (block 69) resulting in a composite pulse signal form which can be passed through a comparator (block 71) to achieve properly conditioned and amplified square serial pulses 71 that can be read by the CPU's UART (block 73). The comparator, which is normally a part of the CPU, is a hybrid analog-digital part and the only active component in the receiver side of the device control module.

It is noted that because the device control module circuit shown in FIG. 4 has an integrated driver, it provides a complete control solution that allows the microprocessor (CPU 31) to be utilized for both driver control and communications. This will further minimize cost and size. The 2-wire power line communication bus shown in FIGS. 1-4 simplifies wiring and assembly reducing cost in assembly and also allows the elements to be "normalized" to compensate for various manufacturing inconsistencies. The result is a product that has a much smoother and matched appearance and is easy to service if a failure does occur, as well as having the ability to detect failures from a control network so the facility management can be alerted as soon as a problem is detected. The ability to control individual elements separately if desired in order to provide more complex effects without added wiring complexity is another benefit.

It is also noted that a minimal PLC system would consist of a DC power source, a master control module with an external interface to whatever external protocol is desired, and one device control module or node. However, in most practical applications, the PLC system would have multiple nodes. The master controller (element 19 in FIG. 1) would be very similar in design to the above-described individual device control modules or nodes. It would include a microprocessor (CPU) with some internal modules for UARTs, clock generation, comparators, and some I/O in addition to anything needed for the main external interface of choice. The master controller for the PLC system is less cost sensitive as there is only one master to serve the entire system. Therefore, some external components can be used here if needed, to which the PLC front end can be added.

The transmitter side of the master controller is simply a gate and inverter fed by the UART and a system clock in order to generate a modulated version of the serial UART signal (a sequence of AC modulated voltage pulses described above). It is noted that the AC modulation is not used as a traditional radio carrier. The modulated voltage pulses or signals are differential to minimize EMI and to improve noise immunity.

Again, as above-mentioned, each device control module has a bus chain switch (element 29 in FIGS. 2-4) for controlling the power feed to the rest of the downstream modules on the bus. This switch is an integral part of the commissioning method described below. By daisy-chaining all of the modules/nodes in a string, only the first node will be powered initially and the rest of the nodes powered seriatim after that. In this way each node can be configured and then instructed to energize the next node in the chain. This makes the addressing consistent, repeatable and dependent on the wiring order. With this approach, the nodes can be replaced or swapped without any change in appearance due to the fact that the addressing is dynamic and is wiring position dependent.

The communication protocols and auto-commissioning method of the invention will now be described in reference to FIGS. 7-18, and again in a lighting fixture application where the PLC system is comprised of three kinds of modules: fixture controller, strand controller, and panel controller. A panel controller in this case is a device control module for monitoring and controlling a light panel, such as an OLED panel or LEDs, of a light fixture. A fixture controller is the communications master and is the only module with an external control interface. A panel controller includes a panel driver. It is intended to provide power and control to a small number of light sources (e.g. OLED panels). In the method described herein, a strand controller is a go-between and essentially acts as a packet repeater; however, strand controllers could be implemented that perform processing activities of the master controller. Intervening strand controllers are necessary since there are electrical constraints which limit the maximum number of devices on a single strand. The system transmits data and control signals using the power and return lines which interconnect all controllers (or modules). A master/slave model can be used to enforce half-duplex communications. There is suitably only one communications master in a system. In the described method, slave modules (the above-described device control modules) cannot initiate communications and must be polled by the master for status and control information.

Figure 7:
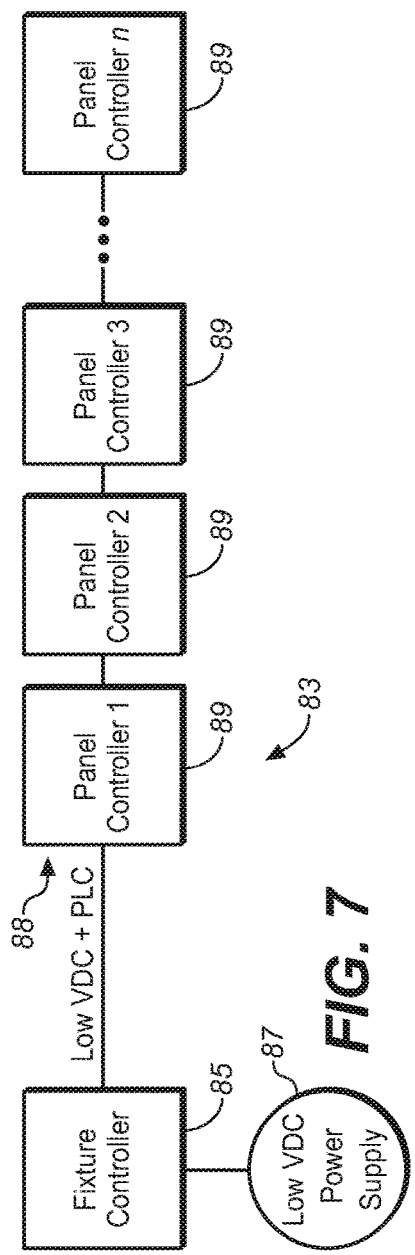
FIG. 7 is a schematic drawing of a small power line communication system in accordance with the invention for a lighting fixture having a single strand of light sources suitably in the form of OLED panels.

The described PLC system supports two general configurations: small configurations without strand controllers and larger configurations with strand controllers. An example of a small system configuration is shown in FIG. 7. Here, a fixture controller 85, which is connected to a low DC voltage power supply 87, acts as the master controller for a multi-panel lighting fixture. In particular, it controls a single strand 88 of panel controllers 89, which are denoted controllers 1-n. (The light panels controlled by the panel controllers are not shown). Each of the panel controllers 89 can have the device control module circuit configuration described above, and will include a bus chain switch 29 such as shown in FIGS. 2-4 such that the fixture controller only communicates with one panel controller on strand 88 at a time. This small, single strand configuration can support a limited number of daisy chained panel controllers, suitably up to about a dozen or so panel controllers. When the number of panel controllers on a single strand gets much larger than this, one or more strand controllers can be used to distribute the communications load and the operating current load of each strand of fixture panels and panel controllers.

Figure 8:
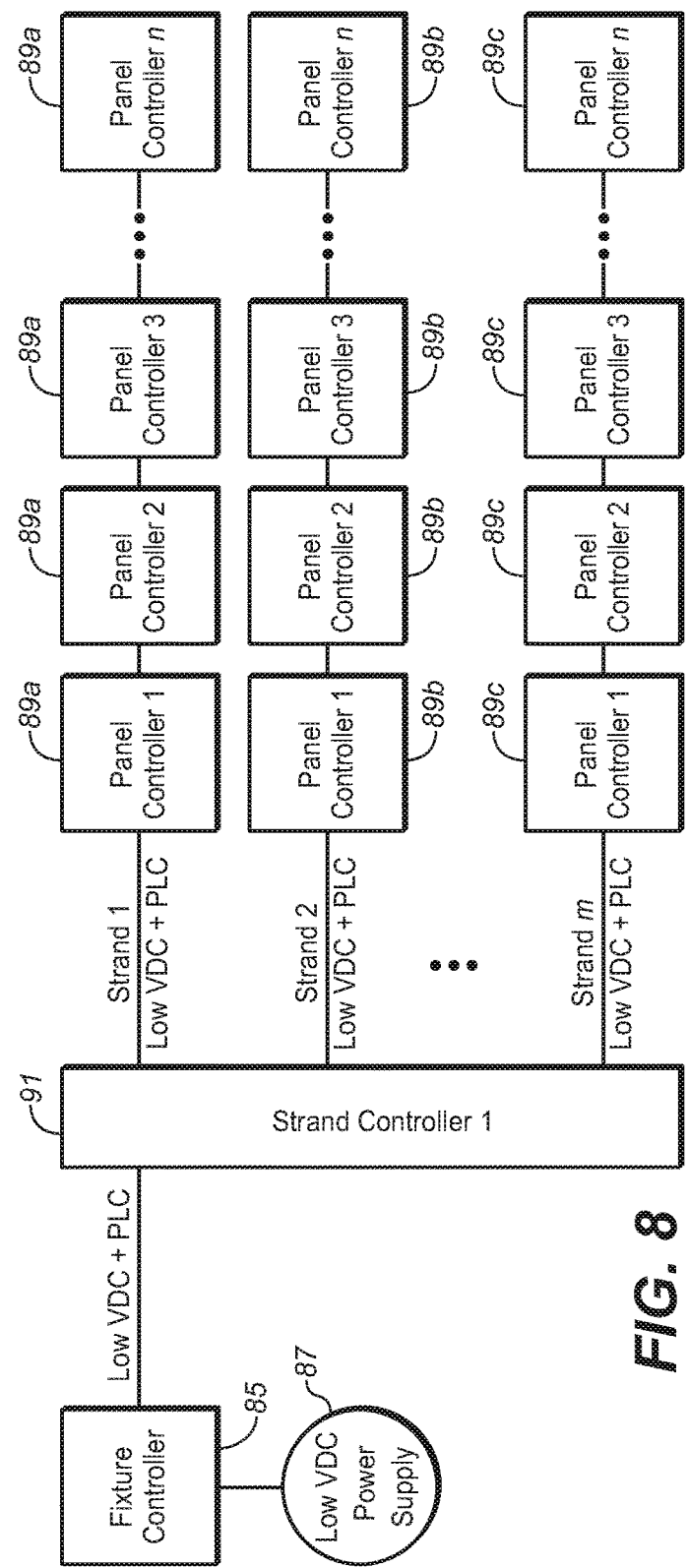
FIG. 8 is a schematic drawing of a large power line communication system in accordance with the invention for a lighting fixture having multiple strands of light sources, suitably in the form of OLED panels, and a strand controller.

The introduction of a strand controller for this purpose is illustrated in FIG. 8, which shows a strand controller 91 placed in front of and connected to multiple strands of panel controllers designated strands 1-m. Each strand on the strand controller has multiple panel controllers denoted 89a, 89b, 89c. Again, the number of panel controllers in each strand (designated by the letter n) will be limited by the considerations mentioned above.

In either the small or large configurations illustrated in FIGS. 7 and 8, the "personality" of a fixture is implemented solely within the fixture controller. That is, the unique implementation of the user interface, machine interface, and usage logic can be isolated to the fixture controller. The same panel and strand controller firmware (and possibly hardware) may be used in multiple fixtures without modification.

Auto-Commissioning

The PLC system described above and illustrated in FIGS. 1-8 has the unique ability to accommodate the auto-commissioning scheme described below in the context of a lighting fixture or system having multiple controllable light sources ("panels" for discussion purposes). With auto-commissioning, the fixture controller powers up each panel controller one at a time and assigns it a unique address. Since addresses are assigned at power-up, any module can be replaced by a like panel controller and panel without any modification or setup of the fixture. Replacing a panel controller is then a simple matter wherein the only limiting factor is physical access.

Figure 9:
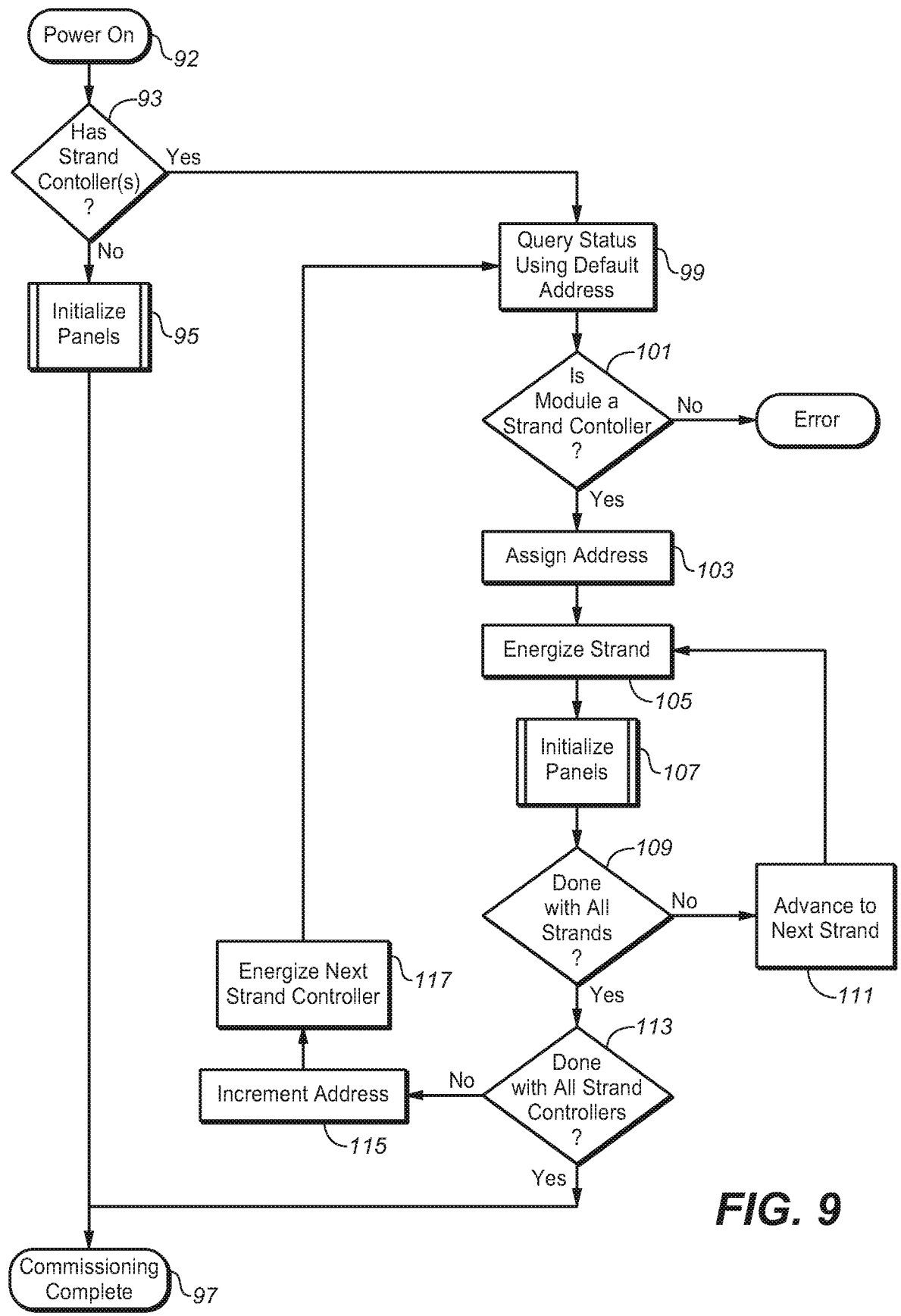
FIG. 9 is a flow diagram showing an auto-commissioning protocol of the power line communication system of the present invention.
Figure 10:
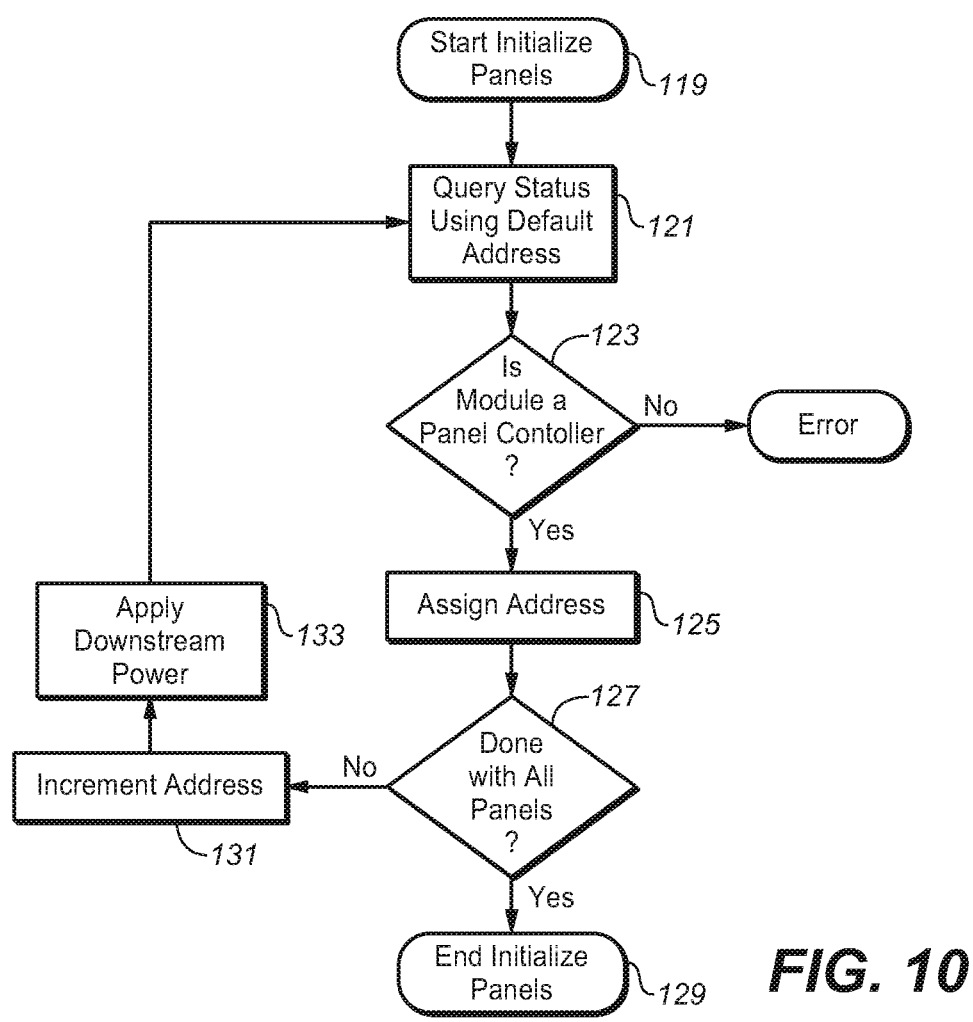
FIG. 10 is a flow diagram showing the strand initialization protocol of the power line communication system of the present invention.

The overall method of commissioning a lighting fixture having multiple panel controllers (device control modules) for multiple light panels of the fixture is illustrated in FIGS. 9 and 10. Commissioning involves the powering up [[to]] of all device control modules and their associated peripheral devices, and initializing the panels and panel controllers including assigning a unique address to each panel controller. It is noted that the initialization process can involve the panel controller communicating with its associated light panel (or other peripheral device) to set the state or status of the panel. In a system that has one or more strand controllers such as illustrated in FIG. 8, the initialization process iterates through each strand controller and each strand connected to the strand controller. In a simpler system without strand controllers as shown in FIG. 7, the system only has to initialize a single strand. Once the panel controllers in the strand have been initialized, its commissioning is complete.

FIG. 9 shows the commissioning process of a multi-panel lighting fixture, which is controlled by a fixture controller. It is seen that commissioning begins when power is turned on (block 92). When the power is turned on, the fixture controller first determines whether a strand controller is present in the system (block 93). If the answer is "no," the fixture controller sequentially initializes the panel controllers in only the strand of panel controllers (block 95) after which the fixture commissioning is complete (block 97). If there are strand controllers in the system, the fixture controller queries the status of the strand controller (are you a "strand controller"?) using a default address pre-assigned to the strand controller (blocks 99 and 101). If the result of this inquiry is negative, an error is detected. Otherwise, the fixture controller assigns a unique address to the strand controller (block 103) and the strand controller is energized (block 105).

The strand controller then initializes the panel controllers (referred to as "panels" in FIGS. 9 and 10) in the strands under its control (block 107). After initializing a strand, the strand controller determines whether all strands under its control have been initialized (block 109) and if not advances to the next strand for initialization (block 111). Once all strands of a strand controller have been initialized by the strand controller, control is handed back to the fixture (master) controller which inquires whether it is done with all strand controllers on the system (block 113). If the answer is "yes," the fixture commissioning is completed (block 97). If the answer is "no," the address is incremented for communicating with the next strand controller (block 115) and the next strand controller is energized (block 117) and assigned an address in a repeat of the sequence of steps represented by blocks 99, 101, 103, 105, 107 109, 111 and 113.

FIG. 10 shows the initialization process for the individual panels and panel controllers whether under the direct control of the master controller (block 95 in FIG. 9) or a strand controller (block 107 in FIG. 9). The master or strand controller starts the initialization process for the panel controllers under its control (block 119). The query is made to the first energized panel controller of a strand using a default address for the panel controller (block 121). If this is a panel controller (block 123), a unique address is assigned to the panel controller (block 125). Otherwise, an error is detected. The master or strand controller then determines if it is done with energizing and assigning unique addresses to panel controllers under its control (block 127). If "no," it increments the address and causes the DC power to be applied to the next-in-line panel controller (block 133). If "yes," the initialization process for all panels and panel controllers in the strand is complete (block 129).

Figure 11A:
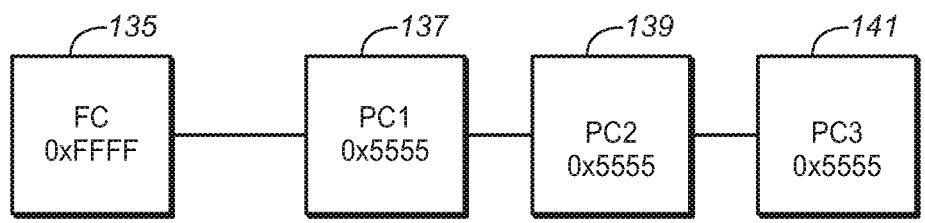
FIGS. 11A-11D are a series of block diagram representations of a power line communication system in accordance with the invention for a lighting fixture having a fixture controller and a string of three panel controllers illustrating power-up sequencing and commissioning of each panel in the string of panels.
Figure 11B:
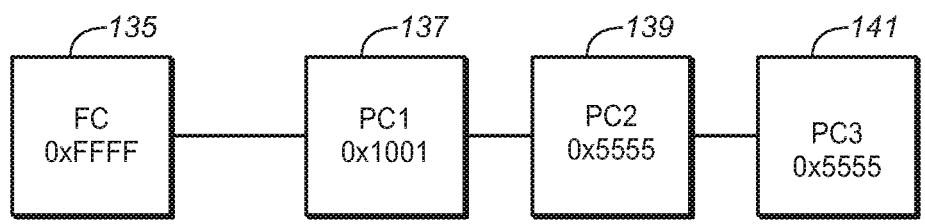
Figure 11C:
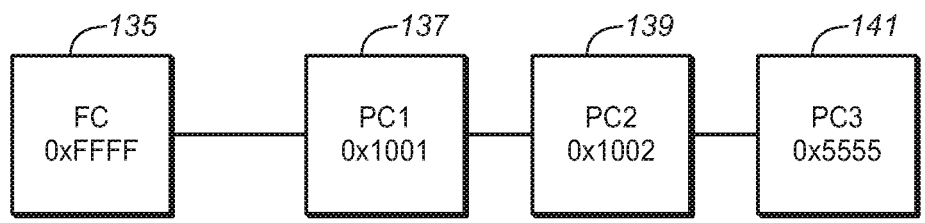
Figure 11D:
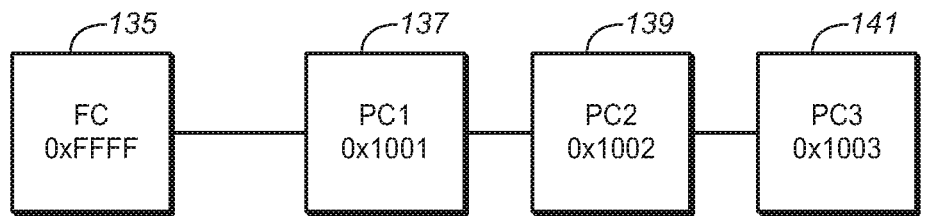

FIGS. 11A-11D show a protocol assigning unique addresses to each of the panel controllers of a lighting fixture (system) comprised solely of a single fixture (master) controller 135 having an address of 0xFFFF and three panel controllers (device control modules) 137, 139, 141, each of which has a pre-assigned default address of 0x5555. At power up, the only module that has power is the fixture controller and the first panel controller 137. Using the default address initially assigned to this panel controller, the fixture controller is able to communicate with this panel controller (FIG. 11A), and to assign it a new unique address as shown in FIG. 11B. The next in line panel controller 139 can then be powered up—this is done via the controller's previously described bus chain switch 29—and the fixture controller then communicates with this next panel controller using the same default address (0x5555) it used to communicate with the previous panel controller. The fixture controller then assigns a new unique address to this next panel controller as shown in FIG. 11C. This process of energizing, communicating with and assigning new unique addresses to the next in line panel controllers is repeated for the last panel controller 141 as shown in FIG. 11D. In this example, the panel controllers are seen to be assigned addresses in the range 0x1001-0x1003.

System configuration using strand controllers is somewhat more complex, but the basic idea of powering up modules and assigning them addresses one at a time is the same. All modules using a strand controller can, for example, use addresses in the 0x2000-0x2FFF address space. This provides an address space for 0x1000 (4096) modules. However, configuration constraints limit the theoretical maximum to 3503 modules.

Maximum strand controllers: 16
Maximum strands per strand controller: 8
If strand controllers are daisy chained, only 1 additional strand controller may be connected
Maximum panel controllers per strand: 31
Maximum panel controllers: 15*7*31+8*31=3503

Figure 12:
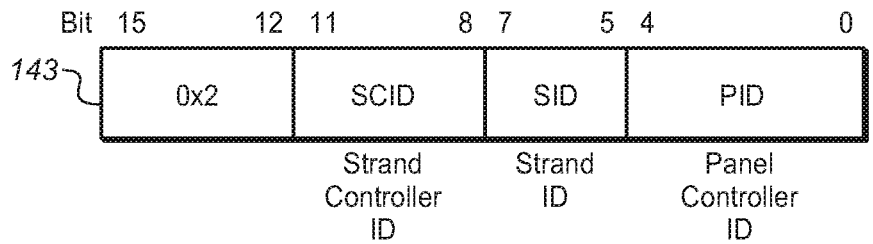
FIG. 12 shows example bit fields for the address of a panel controller using a single strand controller.
Figure 13:
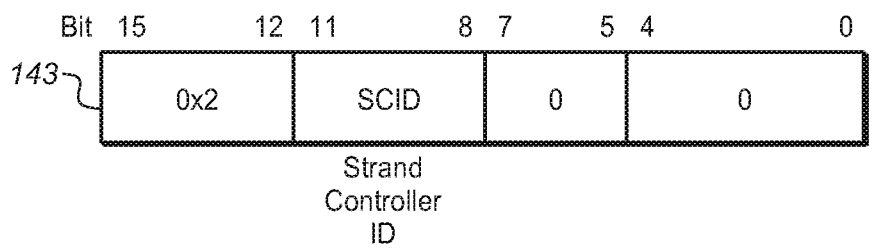
FIG. 13 shows an example of a strand controller address or ID.

In the addressing convention specified here, the address of a module is divided into bit fields specifying the strand controller, the strand on that controller, and the panel on the strand. Thus, it is possible to identify a module from its address alone. FIG. 12 shows example bit fields 143 for the address of a panel controller using a single strand controller. Strand controller addresses have the SID and PID set to 0 (see the bit field 143 in FIG. 13).

The initialization sequence for a system with strand controllers is a little more complicated than a system without. When strand controllers are used, panel controllers are never directly connected to the fixture controller. As above-described, the fixture controller looks first for a strand controller. Once it is found, it iterates through all of the panel controllers on each strand (as in the case without a strand controller). When more than one strand controller is implemented, that strand controller is initialized, and so on until the entire fixture is done (see FIGS. 9 and 10).

Figure 14A:
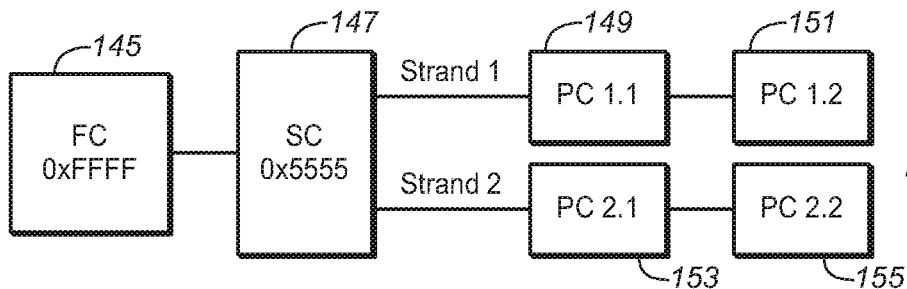
FIGS. 14A-14F are a series of block diagram representations of a power line communication system in accordance with the invention for a lighting fixture having a fixture controller, a strand controller, and two strands of panel controllers, and illustrating the power-up sequencing and commissioning of each panel in each strand of panels under the control of the strand controller.
Figure 14B:
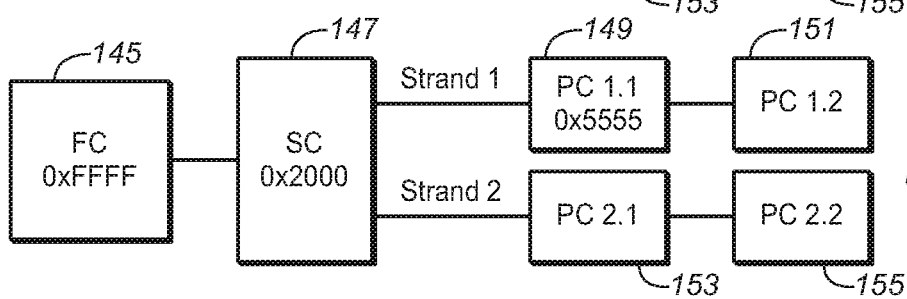
Figure 14C:
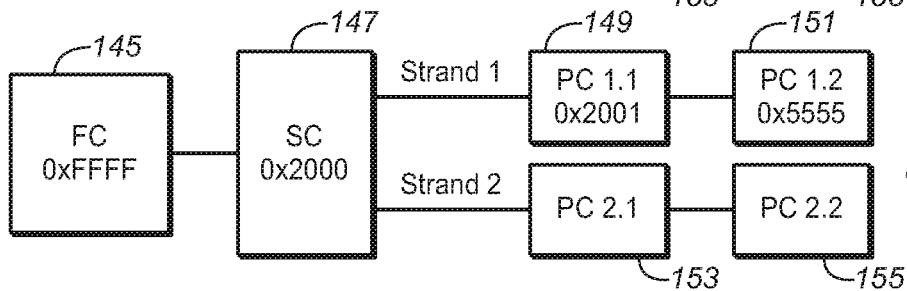
Figure 14D:
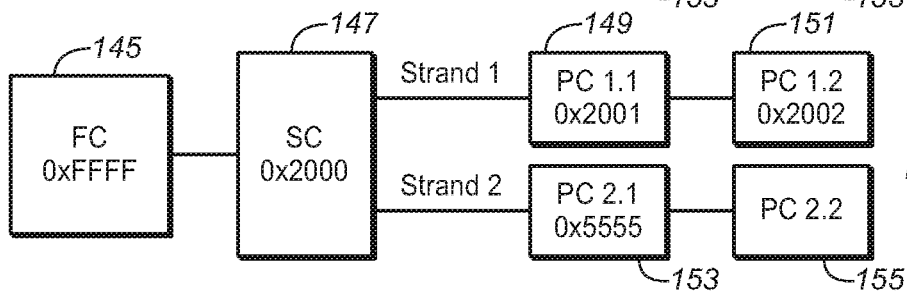
Figure 14E:
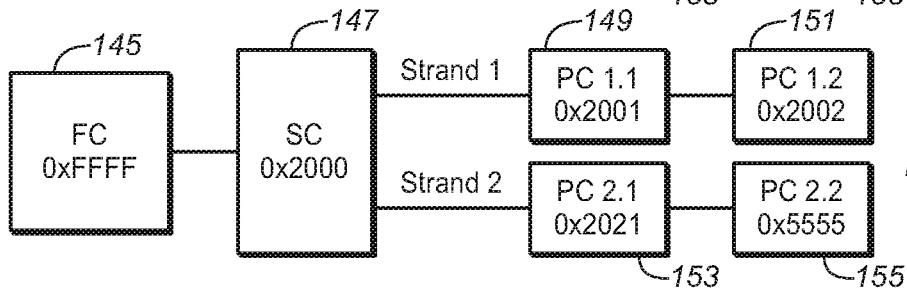
Figure 14F:
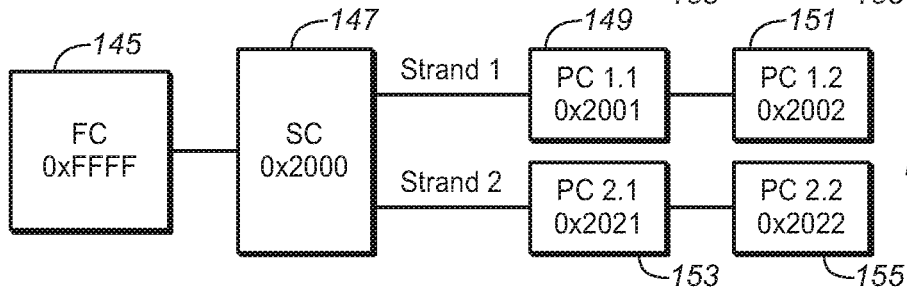

A simple example of auto-addressing initialization with strand controllers present is shown in FIGS. 14A-14F. This example uses one fixture controller 145, one strand controller 147, and two strands of two panel controllers each (these two panel controllers are denoted 149 and 151). At any one time, only one controller (strand or panel) with a default address (0x5555) is powered on so that there is only one controller that will respond to the default address. In the FIG. 14 illustration the sequence starts with the strand controller 147 with default address 0x5555 being powered on so the fixture controller 145 can communicate with this strand controller (FIG. 14A). The fixture controller then assigns a unique address (0x2000) to strand controller 147, whereupon the strand controller is fully initialized and proceeds to energize panel controller 149 having the default address (FIG. 14B). (Again, the powering up of the next in line panel controller can be accomplished through the previously described bus chain switch provider with each controller.) Once powered up, strand controller 147 is able to communicate with the panel controller 149 and assign a new unique address to this panel controller. This sequential powering up and assigning of new unique addresses is repeated with each of the remaining panel controllers 151, 153 and 155 as shown in FIGS. 14C-14F until each panel controller has a unique address and consequently is initialized. This process allows the fixture controller to initialize all control modules one at a time without messages colliding from multiple senders. If additional strand controllers are used, the same initialization sequence is used and extended to each strand controller until all strand controllers (and their panel controllers) are initialized.

Physical Layer

The following chart summarizes exemplary parameters for the physical layer of the communication nodes of the PLC system described herein:

| | |
|---|---|
| Power | Class 2 |
| Signaling | Differential |
| Modulation | Nominally OOK (see below) |
| Communications | Asynchronous serial (e.g. RS-232 or RS-485) |
| Data Format | 1 start bit, 1 stop bit, 8 data bits, no parity |
| Baud Rate | 500 kbps |
| Transmission | Half-duplex |
| Max Modules Per Strand | TBD |

The asynchronous serial format is similar to RS-232 or RS-485 in that the frame for a byte of data includes start and stop bits. However, instead of DC levels indicating mark and space, a modulation carrier can be keyed using on/off keying (OOK) to indicate mark and space. (The modulation carrier is also a complementary signal.) It will be understood that the OOK keyed modulation is not used here in the conventional manner as the modulation is stripped off the serial voltage pulses by the voltage pulse conditioning circuit shown in FIG. 3. There is nothing at the other end, e.g. a notch filter, looking for a tone.

Data Link Layer

Figure 15:
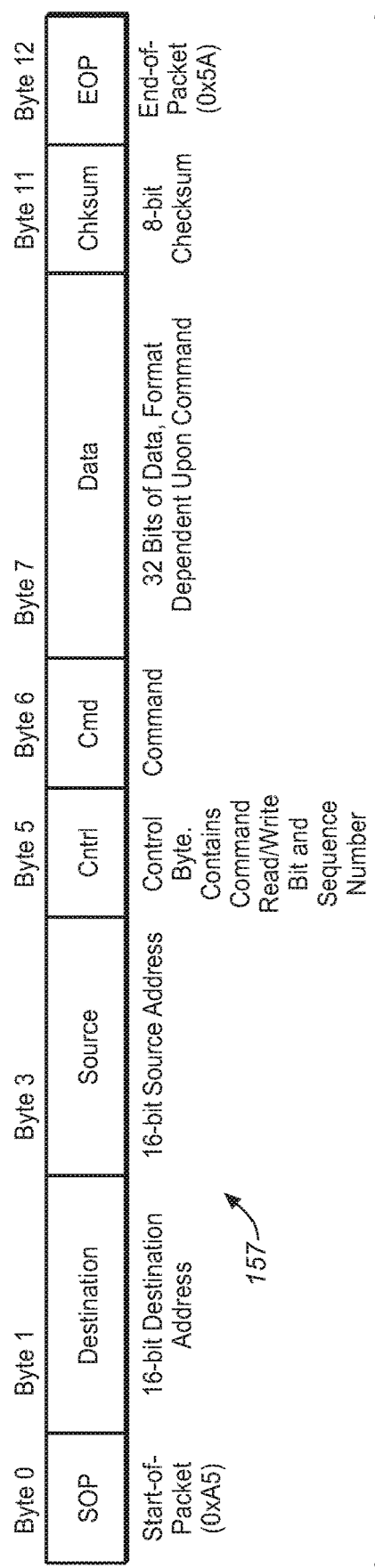
FIG. 15 shows an exemplary packet format for the data link layer of the power line communication system of the present invention.

FIG. 15 shows the packet format for the data link layer of the power line communication system. The packet has a fixed packet size with start-of-packet and end-of-packet markers. The PLC protocol described uses 16-bit addresses. While it is technically possible to use any address on any module, the address space is partitioned to provide support for the modules described herein. All valid addresses are described below in Table 1. All other addresses are reserved.

TABLE 1

16-bit PLC address map

| Start | End | Description |
|---|---|---|
| 0x0000 | — | Broadcast address |
| 0x1000 | 0x10FF | Panel Controller address without a strand controller |
| 0x2000 | 0x2FFF | Addresses for modules using strand controller |
| 0x5555 | — | Default address for strand and panel controllers |
| 0xE000 | 0xEFFF | Multicast address |
| 0xFFFF | — | Default address for fixture controller |

0xFFFF Factory default address for fixture controllers
0xEnnn Multicast address (nnn = 000 . . . FFF)
0x5555 Factory default address to strand and panel controllers
0x2s00 Strand controller address (s = 0 . . . F)
0x2snn Panel controller address on a strand (s = 0 . . . F, nn = 01..FF)
0x10nn Panel controller address without a strand controller (nn = 01 . . . FF)
0x0000 Broadcast address Data Link Layer—Protocol The PLC communications described herein use a master/slave configuration. All PLC communications are initiated by the master controller, which in this case is a fixture controller. There is only one communications master within a fixture. Communications slaves (panel controllers) may not initiate communications; it is up to the master controller to poll each slave for status if necessary.

Figure 16:
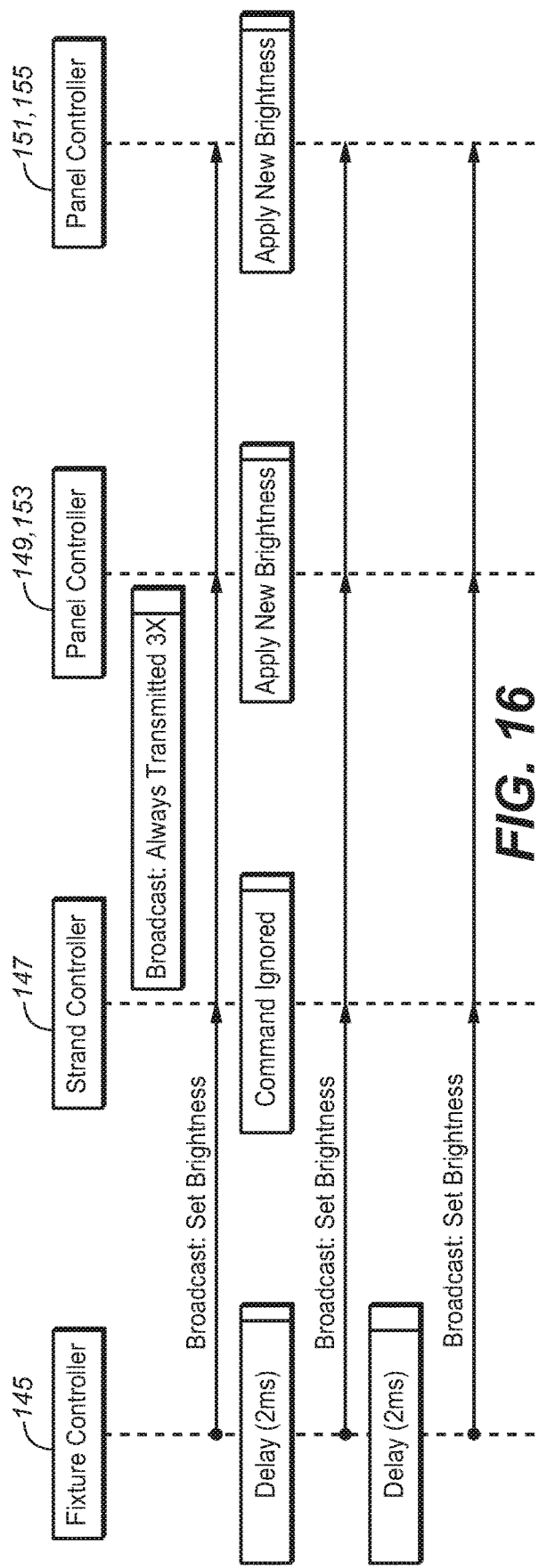
FIG. 16 shows how broadcast transmissions are processed by the receiving modules of the power line communication system of the invention.
Figure 17:
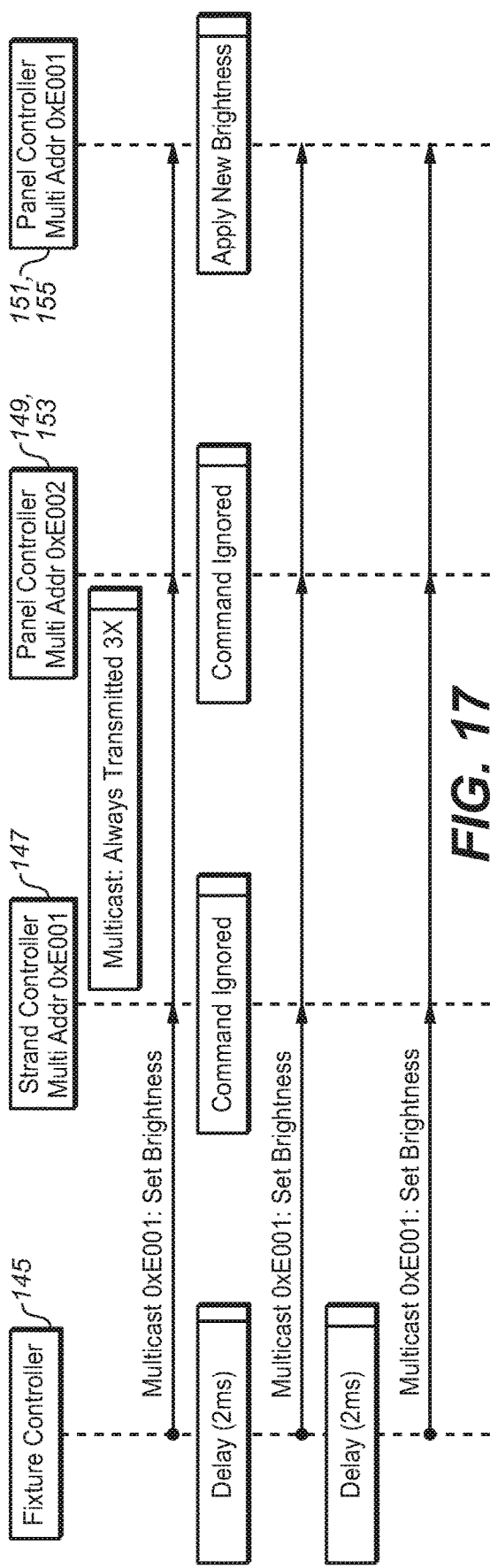
FIG. 17 shows how multicast transmissions are processed by the receiving modules of the power line communication system of the invention.
Figure 18:
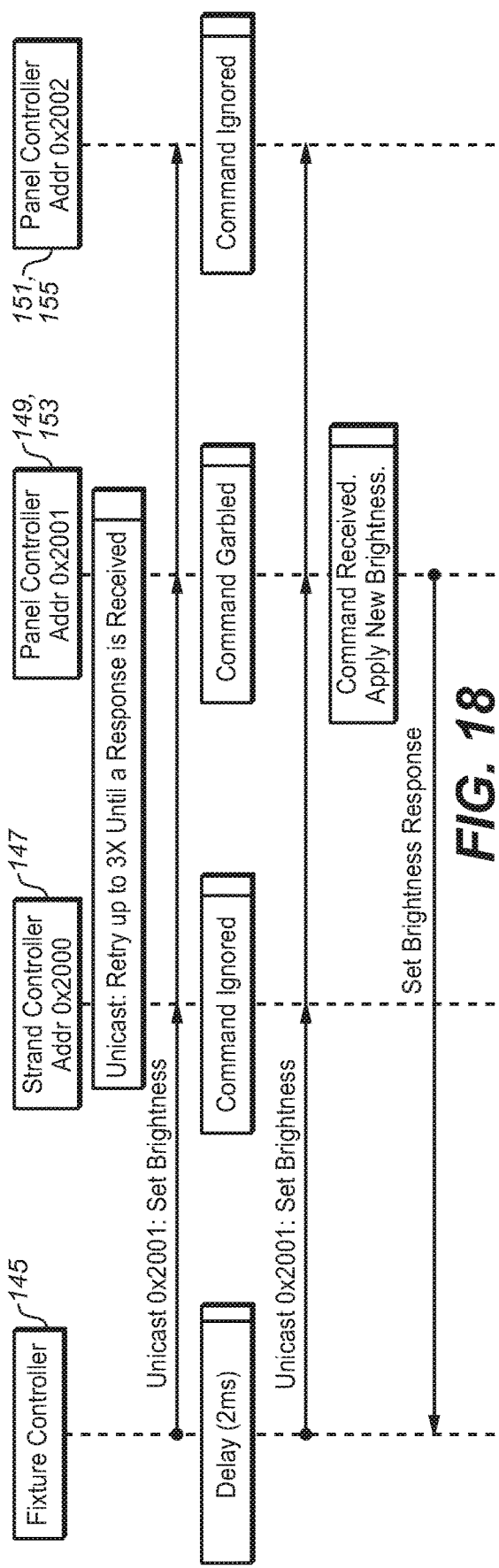
FIG. 18 shows how unicast transmissions are processed by the receiving modules of the power line communication system of the invention.

As illustrated in FIGS. 16-18, the PLC described herein supports three kinds of packet transmissions: broadcast (FIG. 16), multicast (FIG. 17), and unicast (FIG. 18). FIGS. 16-18 illustrate communication protocols for the system configuration shown in FIG. 14, comprised of a fixture controller 145, one strand controller 147, and two strands of panel controllers, strand 1 with panel controllers 149 and 151 and strand 2 with panel controllers 153, 155. The communications are initiated by fixture controller 145, which communicates with the strand controller and panel controllers on strands 1 and 2. In broadcast and multicast transmissions the broadcast transmissions are processed by all receiving controllers, i.e., all strand and panel controllers. If the command does not apply to a particular controller, the command is ignored (see FIG. 16). If the command does apply, no response is generated.

Multicast transmissions use multicast addresses. A controller processes a multicast packet only if it matches its multicast address (see FIG. 17). In the illustrated example, strand and panel controllers may only have one multicast address. No response is generated for a multicast command.

Unicast transmissions are processed only by controllers with that unique address (see FIG. 18). The fixture controller sends a unicast packet and waits for a response. When the timeout period elapses, the packet is retransmitted. This process is repeated until a response is received or until the number of retries is exhausted. If the number of retries is exhausted, that packet is lost. FIG. 18 shows how unicast transmissions are processed by the receiving controllers of the power line communication system of the invention.

While the aspects of the invention have been described in considerable detail in the foregoing specification, it will be understood that the invention shall not be limited to such detail except as necessitated by the following claims.

We claim:

1. A method for commissioning multiple addressable device control modules connectable to a power line of a power line communication system, wherein each device control module of the power line communication system is used to provide power to and communicate with at least one controllable device, the method comprising:

causing a first one of the multiple device control modules to be connected to the power line of the power line communication system thereby bringing the first one of the device control modules on-line such that communication can be established with the first device control module, communicating with the first device control module using a default address given to said first device control module, including assigning a new unique address to said first device control module in place of its default address, causing a next one of the multiple device control modules to be connected to the power line of the power line communication system thereby bringing the next one of the device control modules on-line such that communication can be established with the next one of the device control modules, communicating with the next one of the device control modules using a default address given to the next one of the device control modules, including assigning a new unique address to the next one of the device control modules in place of its default address, repeating the foregoing steps for other device control modules of the power line communication system until such other device control modules are brought on-line and have unique addresses, wherein the device control modules that have been brought on-line can be addressed over the power line communication system using the unique addresses assigned to the device control modules.

2. The method of claim 1 wherein the same default address is pre-assigned to each of the multiple addressable device control modules and wherein at any time during the commissioning of the device control modules only one device control module of the power line communication system is addressable using the default address.

3. The method of claim 1 wherein the device control modules are arranged in a strand connected to an addressable strand controller which in turn is connectable to the power line of the power line communication system to bring the strand controller on-line, and wherein the addressable strand controller is assigned a default address along with the device control modules of the strand, the method further comprising:

bringing the strand controller on-line, using the default address of the strand controller, communicating with the strand controller including assigning a unique address to the strand controller, using the strand controller to thereafter sequentially bring the device control modules of the strand of device control modules on-line, and further using the strand controller to sequentially communicate with each device control module of the strand at the default address of the device control module when the device control module is brought on-line, including assigning a unique address to the device control module.

4. The method of claim 1 wherein the device control modules are commissioned in accordance with the steps of the method under the control of a master controller.

5. The method of claim 1 wherein each addressable device control module is connected to the power line of the power line communication system by a power line switch of an upstream device control module, and wherein the step of bringing a next one of the multiple device control modules on-line includes actuating the power line switch of an upstream device control module.

6. The method of claim 1 wherein the at least one controllable device is a lighting device of a lighting fixture or system.

7. The method of claim 1 wherein the at least one controllable device is a sensor.

8. The method of claim 1 wherein the at least one controllable device is a messaging device.

9. The method of claim 1 wherein the at least one controllable device is one of a (i) lighting device, (ii) sensor or (iii) messaging device.

10. The method of claim 1 wherein the at least one controllable device comprises two or more of a (i) lighting device, (ii) sensor or (iii) messaging device.

11. The method of claim 1 wherein the device control modules are arranged in a at least two strands and wherein each strand is connected to an addressable strand controller which in turn is connectable to the power line of the power line communication system to bring the strand controller on-line, and wherein each addressable strand controller is assigned a default address along with the device control modules of the strand, the method further comprising:
bringing a first one of the strand controllers on-line,
communicating with the strand controller using the default address given to such strand controller, including assigning a unique address to the strand controller,
using such strand controller to thereafter sequentially bring the device control modules of the strand of device control modules connected to the strand controller on-line,
further using said strand controller to sequentially communicate with each device control module of the strand of device control modules at the default address given to the device control module when the device control modules are brought on-line, including assigning a unique address to the device control module,
bringing a next one of the strand controllers on-line,
repeating the foregoing steps for each of the strand controllers of the power line communication system for bringing the device control modules of each strand of device control modules on-line and for assigning unique addresses to the devices control modules of the strand.

12. The method of claim 11 wherein the same default address is pre-assigned to each strand controller and addressable device control modules of the strands connected to the strand controllers, and wherein at any time during the commissioning of a strand of device control modules only one device control module of the strand is addressable by the strand controller at the default address of the device control module.

13. The method of claim 11 wherein the strand controllers are commissioned in accordance with the steps of the method under the control of a master controller.

14. The method of claim 1 wherein the power line of the power line communication system is a DC power line and wherein each device control module of the power line communication system is configured to receive both DC power from the DC power line and digital signals transmitted over the DC power line, and further wherein, when a device control module is brought on-line during commissioning, a digital signal is transmitted to the device control module which changes the address of the device control module.

15. The method of claim 14 wherein the digital signal transmitted to the device control unit includes a control signal for bringing the next one of the device control modules on-line.

16. The method of claim 14 wherein the power line of the power line communication system is a 12-volt DC power line.

17. A method for commissioning multiple addressable device control modules connectable to a power line of a power line communication system, wherein each device control module of the power line communication system is used to provide power to and communicate with at least one controllable device, and wherein a default address is pre-assigned to each of the multiple addressable device control modules of the power line communication system, and further wherein before the commissioning of the device control modules only an initial device control module is connected to and addressable over the power line of the power line communication system, the method comprising:
using the pre-assigned default address for the device control modules, sending a query over the power line of the power line communication system requesting a response from a device control module having a default address,
assigning a unique address to the responding device control module which can be used for future communications with the responding device control module,
causing another device control module having a default address to be connected to the power line of the power line communication system,
using the pre-assigned default address for the device control modules, sending another query over the power line of the power line communication requesting a response from a device control module having a default address,
assigning a new unique address to the responding device control module,
repeating the foregoing steps until all device control modules are connected to the power line of the power line communication system and have responded and been assigned a unique address.

18. The method of claim 17 wherein the device control modules of the power line communication system are commissioned in accordance with the claimed steps of the method under the control of a master controller.

19. The method of claim 17 wherein the device control modules are arranged in strands connected to addressable strand controllers which in turn are connectable to the power line of the power line communication system to bring the strand controllers on-line, and wherein the addressable strand controllers are assigned a default address along with the device control modules of the strands, and further wherein before commissioning begins only one strand controller is connected to and addressable over the power line of the power line communication system, the method further comprising:
using the pre-assigned default address, sending a query over the power line of the power line communication system requesting a response from a strand controller having a default address,
assigning a unique address to the responding strand controller,
under the control of the strand controller commissioning the device control modules connected to the strand controller,
causing another strand controller having a default address to be connected to the power line of the power line communication system,
using the pre-assigned default address, sending another query over the power line of the power line communication system requesting a response from a strand controller having a default address, assigning a new unique address to the responding strand controller, under the control of the strand controller, commissioning the device control modules connected to the strand controller, repeating the foregoing steps until all strand controllers and device control modules under the control of the strand controllers are connected to the power line of the power line communication system and have responded and been assigned a unique address.

20. The method of claim 19 wherein the strand controllers are commissioned in accordance with the claimed steps of the method under the control of a master controller.

21. A method of commissioning multiple addressable device control modules sequentially connectable to a power line of a power line communication system, wherein each device control module of the power line communication system is used to provide power to and communicate with at least one controllable device, and further wherein each device control module is initially assigned a default address, the method comprising:

sequentially addressing and initially communicating with downstream device modules at the default address assigned to device control modules as the device control modules are sequentially connected to the power line of the power line communication system, and during such initial communications sequentially assigning unique addresses to the downstream device control modules in place of their default addresses.

22. The method of claim 21 wherein the same default address is pre-assigned to each of the multiple addressable device control modules and wherein at any time during the commissioning of the device control modules only one device control module of the power line communication system is addressable using the default address.

23. The method of claim 21 wherein device control modules of the power line communication system are switchably connected to downstream device control modules and wherein, after a unique address is assigned to a downstream device control module, the sequential communications with the downstream device control modules further include instructing the downstream control module to switch to a next downstream device control module having a default address, wherein the next device control module is connected to the power line of the power line communication system.

24. The method of claim 21 wherein the power line of the power line communication system is a DC power line and wherein each device control module of the power line communication system is configured to receive both DC power from the DC power line and digital signals transmitted over the DC power line, wherein communications with a device control modulße are accomplished by digital data and control signal transmissions over the power line.

25. The method of claim 24 wherein the power line of the power line communication system is a 12-volt DC power line.

26. A method for commissioning multiple addressable device control modules connectable to a DC power line of a power line communication system, wherein each device control module of the power line communication system is used to provide power to and communicate with at least one controllable device, and wherein a default address is pre-assigned to each of the multiple addressable device control modules, and further wherein each addressable device control module is connected to the power line of the power line communication system by a power line switch of an upstream device control module, the method comprising:

causing a first one of the multiple device control modules to be connected to the power line of the power line communication system thereby bringing the first one of the device control modules on-line such that communication can be established with the first device control module, addressing the first device control module using a default address given to said first device control module and assigning a new unique address to said first device control module in place of its default address, actuating the power line switch of the first device control module to bring a next one of the multiple device control modules on-line such that communication can be established with the next one of the device control modules, addressing the next one of the device control modules using a default address given to the next one of the device control modules and assigning a new unique address to the next one of the device control modules in place of its default address, repeating the foregoing steps for other device control modules of the power line communication system until such other device control modules are brought on-line and are given unique addresses, wherein the device control modules are commissioned, in that, they are all on-line and can be individually addressed over the power line communication system using the unique addresses assigned to the device control modules.

27. A method of commissioning multiple addressable device control modules connectable to a power line of a power line communication system by a switch of an upstream device which is connected to the power line of the power line communication system, whereby actuation of the switch of an upstream device control module brings the next downstream device control module on-line, and further wherein the device control modules downstream of upstream on-line device control modules have default addresses, the method comprising:

actuating the switch of an on-line device control module to bring the next downstream control module on-line, assigning a unique address to the next downstream device control module in place of its default address, repeating the foregoing steps until the device control modules of the power line communication system have been brought on-line and assigned new unique addresses.

28. The method of claim 27 wherein the power line of the power line communication system is a DC power line and wherein each device control module of the power line communication system is configured to receive both DC power from the DC power line and digital signals transmitted over the DC power line, and further wherein assigning a new address to a next device control module that has be brought on-line is accomplished by a digital signal transmitted over the power line.

\* \* \* \* \*